United States Patent [19]

Galle, Jr.

[11] 4,441,741
[45] Apr. 10, 1984

[54] CONNECTORS FOR SECURING MEMBERS TOGETHER UNDER LARGE CLAMPING FORCE

[75] Inventor: Edward M. Galle, Jr., Houston, Tex.

[73] Assignee: Armco Inc., Middletown, Ohio

[21] Appl. No.: 327,446

[22] Filed: Dec. 4, 1981

[51] Int. Cl.³ .................. F16L 35/00; F16L 55/00
[52] U.S. Cl. ......................... 285/18; 166/340; 166/351; 285/315; 285/320; 285/DIG. 21
[58] Field of Search .................. 166/339, 340, 351; 285/18, 315, 317, 320, 321, DIG. 21

[56] References Cited

U.S. PATENT DOCUMENTS

| | | |
|---|---|---|
| 1,825,774 | 10/1931 | Boynton . |
| 1,933,935 | 11/1933 | Santiago . |
| 2,470,256 | 5/1949 | McIlroy . |
| 2,657,904 | 11/1953 | Evenson . |
| 2,860,893 | 11/1958 | Clark . |
| 2,965,073 | 12/1960 | Alfieri . |
| 3,278,158 | 10/1966 | Saldana . |
| 3,321,217 | 5/1967 | Ahlstone ................... 285/315 X |
| 3,354,951 | 11/1967 | Savage et al. . |
| 3,536,344 | 10/1970 | Nelson ....................... 285/315 X |
| 3,643,984 | 2/1972 | Bucceri ....................... 285/382.7 |
| 3,675,713 | 7/1972 | Watkins ....................... 166/340 |
| 3,774,352 | 11/1973 | Weber . |
| 3,997,198 | 12/1976 | Linder . |
| 4,049,297 | 9/1977 | Reneau ....................... 285/315 X |
| 4,153,278 | 5/1979 | Ahlstone ..................... 285/315 X |
| 4,188,050 | 2/1980 | Lachte ........................ 285/315 X |
| 4,225,160 | 9/1980 | Ortloff . |
| 4,270,398 | 6/1981 | Arnold . |
| 4,290,483 | 12/1981 | Lawson ....................... 285/315 X |
| 4,337,971 | 7/1982 | Kendrick ..................... 285/320 |

Primary Examiner—Wayne L. Shedd
Attorney, Agent, or Firm—Roylance, Abrams, Berdo & Goodman

[57] ABSTRACT

Connector, particularly for use in underwater well installations, for securing members together under large clamping forces. The connector is characterized by two successive stages of actuation of a locking means, typically a split ring or set of arcuate segments, with the actuating force of the second stage being applied by camming surfaces via low friction means to establish a high compressive preload without use of especially large power devices.

18 Claims, 10 Drawing Figures

CONNECTORS FOR SECURING MEMBERS TOGETHER UNDER LARGE CLAMPING FORCE

This invention relates to connectors for securing members together under large clamping forces and, though more generally applicable, is particularly advantageous for connecting members of an underwater well installation under conditions requiring that the connection be made up by operations carried out from a location remote with respect to the well installation.

RELATED APPLICATIONS

Subject matter disclosed in this application is also disclosed and claimed in copending applications Ser. No. 327,449, filed concurrently herewith by James H. Owens, III, and Ser. No. 327,445, filed concurrently herewith by William S. Cowan and Edward M. Galle, Jr.

BACKGROUND OF THE INVENTION

The need for developing large clamping forces in connectors for securing two members together has long been recognized. Providing large clamping forces is especially important when the connector is to be used for connecting two tubular members of an underwater well installation, since the connection must then withstand not only large forces resulting from component weight and the actions of waves and currents but also large internal fluid pressures. All of the successful prior-art connectors employed in the underwater well field for developing high clamping forces appear to employ annular locking means, varying from annularly arranged locking dogs to a single split locking ring, the locking means being carried by one of the members to be connected and having a frustoconical locking shoulder to engage with a mating shoulder carried by the other member. Opposed transverse end surfaces are provided, and the effect of the locking means, when actuated, is to clamp the end faces together, the locking shoulders providing a strong wedging action to generate the clamping force. In such connectors, actuation of the locking means is accomplished by rectilinear power devices which act in a direction generally axially of the connector. To convert the action of the power devices into effective movement of the locking means, it has become a standard practice to have the power device force a driving ring axially relative to the connector, the driving ring having a frustoconical camming face which slidably engages the locking means to force the locking means generally radially and thus cause the desired wedging action at the locking shoulders. Connectors of this general type are described, for example, in the following U.S. Patents:
U.S. Pat. No. 2,962,096, Knox
U.S. Pat. No. 3,096,999, Ahlstone et al
U.S. Pat. No. 3,228,715, Neilon et al
U.S. Pat. No. 4,200,312, Watkins.

Particularly in the case of underwater well connectors, the difficulties encountered in achieving satisfactory connections are increasingly severe. Such connectors have always been required to withstand both large internal fluid pressures and great, frequently transient, external forces. However, with installations of wells occurring at ever-increasing water depths, and with wells exhibiting increasing large internal pressures, the forces tending to make the connection fail continue to increase. Thus, underwater wellheads are now being required to withstand and seal against internal pressures as high, e.g., as 15,000 p.s.i., and water depths for such installations are now likely to be measured in thousands of feet, so that forces applied to the connector via, e.g., a riser are correspondingly larger. Prospective users of such connectors therefore present increasingly severe specifications for the connector, and the requirements of such specifications prove difficult to meet, so there is an increasing need for improvement of connectors of this general type.

It has been recognized that, in such connectors, it is desirable to place the mating surfaces of the two members to be connected under a large compressive preload, advantageously just short of the yield point of the metal. The preload is established by first engaging the frustoconical locking shoulders and then continuing to supply a large actuating force to the locking means to create a very strong wedging action between the locking shoulders. Success of this action is limited by the adverse effect of sliding friction under the great pressures required, and the desired large compressive preload has frequently not been achieved in practice despite the use of large actuating motors. As disclosed in aforementioned application Ser. No. 327,449, a remarkable improvement in the efficiency of such connectors can be achieved by employing rolling antifriction elements between the camming surface of the driving ring and the cam follower surface of the locking means. However, provision of connectors including the antifriction elements has been difficult to achieve in commercially acceptable form.

OBJECTS OF THE INVENTION

A general object of the invention is to provide a connector of the type described which, though capitalizing on reduced friction provided by rolling antifriction elements during the final stage of actuation, during which compressive preload is established, requires only low power actuation preliminary to establishment of the preload.

Another object of the invention is to devise such a connector which, though providing large clamping forces and establishing a high and persistent compressive preload, requires only relatively small power devices.

A further object is to provide a connector of the type described which makes it possible to employ very small camming angles for actuating the locking means, yet does not require that the driving ring be moved through an especially long travel.

Yet another object is to devise such a connector which has a very high mechanical advantage.

A still further object it to provide a connector of the type described which accomplishes a final stage of operation with the aid of rolling antifriction elements, yet is axially compact and of relatively simple construction.

Another object is to provide such a connector characterized by a low power preliminary operating stage, which accomplishes initial engagement of the locking shoulder, and a subsequent high power operating stage, which establishes a high clamping force, the two stages of operating being accomplished remotely and in automatic succession.

SUMMARY OF THE INVENTION

Connectors according to the invention include an annular locking means which presents an annular locking shoulder, the locking means being radially distortable between an inactive position and an active position and being biased resiliently toward the inactive position. The locking means can be a resilient metal split ring, which is particularly advantageous, or an annular assembly of arcuate segments, or an annular series of locking dogs. Operation of the locking means is accomplished by two actuating means, the first comprising a resiliently expansible and contractible annular member which telescopically engages the locking means and is movable axially relative to the connector between a first position, in which the locking means is allowed to assume its inactive position, and a second position. The locking means has a first frustoconical surface which coacts with a second frustoconical surface on the annular member of the first actuating means in such fashion that, when the annular member is moved axially to its second position, the locking means is radially distorted through most of its excursion from its inactive position toward its active position. The annular member also has a third frustoconical surface which faces away from the locking means and tapers in the same direction as the first and second frustoconical surfaces but at a smaller angle. A second actuating means is employed and includes a rigid driving ring having a fourth frustoconical surface, that surface constituting a camming surface facing the third frustoconical surface and tapering in the same direction and at the same angle. A plurality of rigid rolling antifriction elements are disposed between and in rolling engagement with the third and fourth frustoconical surfaces. The driving ring is disposed for movement between a first position, in which the annular member of the first actuating means can occupy its first position, and a second position, movement of the driving ring from its first position to its second position causing the third and fourth frustoconical surfaces and the rolling antifriction elements to coact to resiliently distort both the annular member of the first actuating means and the locking means to an extent which causes the locking means to complete its travel to its full active position. Operation of the first actuating means if thus effective to accomplish most of the necessary radial distortion of the locking means through the camming action of directly engaged frustoconical surfaces, but since this operation only moves the locking shoulder into initial engagement with the mating shoulder, the sliding friction involved is relatively small and only relatively low power is necessary to operate the first actuating means. Completion of the radial distortion of the locking means is accomplished by the second actuating means and requires the high power necessary to establish the desired large clamping force and compressive preload. This operation is accomplished by coaction of the driving ring and the annular member of the first actuating means through the rolling antifriction elements, so that the losses due to friction are held to a practical minimum and a larger clamping force can therefore be established at a lower power requirement. Advantageously, the first and second actuating means include separate sets of rectilinear power devices, those for the first actuating means being less powerful than those for the second actuating means.

DETAILED DESCRIPTION OF THE INVENTION

The Embodiment of FIGS. 1–9

Figure 1:
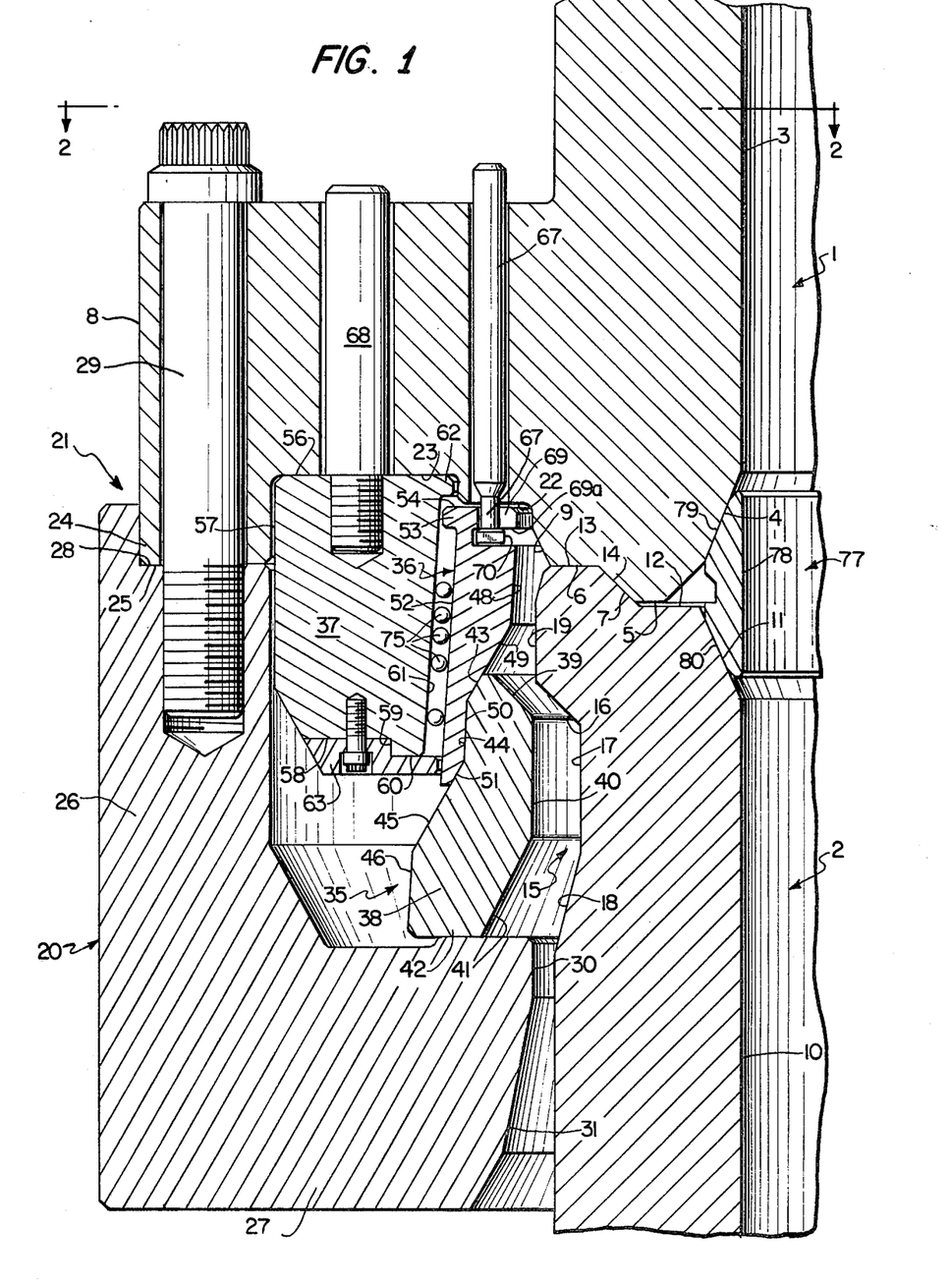
FIG. 1 is a fragmentary vertical sectional view of a connector according to one embodiment of the invention as employed for connection of two wellhead bodies of an underwater well installation, the locking means of the connector being shown in its inactive position.
Figure 2:
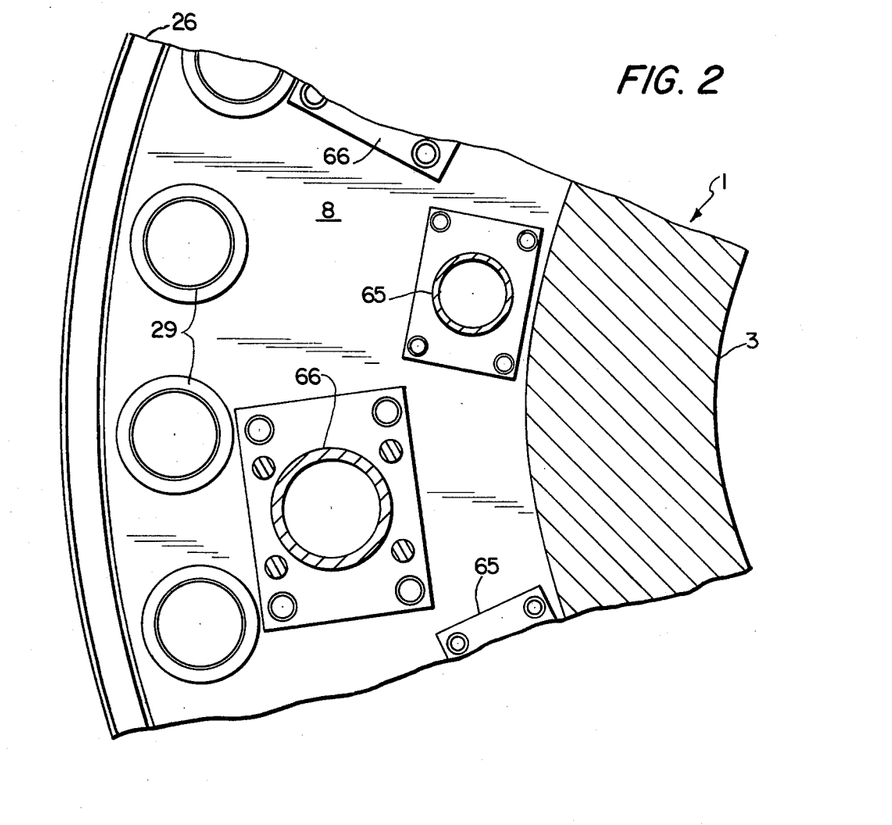
FIG. 2 is a fragmentary transverse cross-sectional view taken generally on line 2—2, FIG. 1, power devices for the connector being shown in FIG. 2 but omitted in FIG. 1.

In the embodiment of the invention shown in FIGS. 1–9, the connector is remotely operated and is employed to connect a wellhead upper body 1, typically at the base of a blowout preventer stack, to a wellhead lower body 2, FIG. 2, in an underwater well installation. Body 1 has a right cylindrical through bore 3 and a transverse annular lower end face, the end face including at its inner periphery a frustoconical seal surface 4 which tapers upwardly and inwardly, an inner transverse portion 5, an outer transverse annular portion 6 spaced outwardly from portion 5, and a frustoconical shoulder 7 which tapers downwardly and inwardly and joins portions 5 and 6. Adjacent the lower end face, body 1 has an integral transverse annular outwardly projecting flange 8, there being an additional frustoconical surface 9 interconnecting the inner periphery of the lower face of flange 8 and the outer edge of surface portion 6.

Lower body 2 has a right cylindrical through bore 10 of approximately the same diameter as bore 3. The upper end face of body 2 includes a downwardly and inwardly tapering frustoconical seal surface 11, an inner transverse annular surface portion 12, an outer transverse annular portion 13, and a downwardly and inwardly tapering frustoconical shoulder 14, the angle of taper of shoulders 7 and 14 being the same. The dimensions of the two end faces are such that the downwardly directed surfaces at 6 and 7 mate with the upwardly directed surfaces at 13 and 14, respectively. The upper end portion of lower body 2 has a transverse annular outwardly opening locking groove 15 defined by a frustoconical upper side wall 16 which tapers downwardly and inwardly at the same angle as shoulders 7 and 14, a right cylindrical inner wall 17, and an upwardly and inwardly tapering frustoconical lower wall 18. Above groove 15, body 2 has a right cylindrical outer surface portion 19.

Flange 8 of body 1 combines with an annular member 20, of generally L-shaped radial cross section, to define an annular connector body indicated generally at 21. Applying usual connector terminology, upper body 1 and connector body 21 combine to form the female connector member, and lower body 2 constitutes the male connector member.

Proceeding outwardly from its juncture with surface 9, the lower face of flange 8 includes a transverse annular surface portion 22, a shallow annular downwardly opening groove 23, a dependent cylindrical flange 24 the inner surface of which forms a continuation of the outer side wall of groove 23, and an outer transverse annular surface portion 25. Member 20 is an integral piece including an upstanding tubular wall 26 and a transverse annular portion 27 lying in a plane at right angles to the axis of wall 26. The free end of wall 26 is annularly notched to accommodate flange 24 and includes a transverse annular end face 28 in flush engagement with surface portion 25 of flange 8. Member 20 is rigidly secured to flange 8, and thus to body 1, by a plurality of high strength screws 29 arranged in an annular series and including unthreaded portions extending through flange 8 and threaded portions engaged in threaded bores in wall 26. The inner periphery of portion 27 of member 20 includes a right cylindrical surface portion 30 of a diameter larger than the outer diameter of body 2 above groove 15, and two frustoconical upwardly and inwardly tapering guide surface portions 31 disposed to assist in guiding and centering the female connector member as it is lowered, with assistance of a conventional guidance system (not shown), onto the male connector member.

Figure 3:
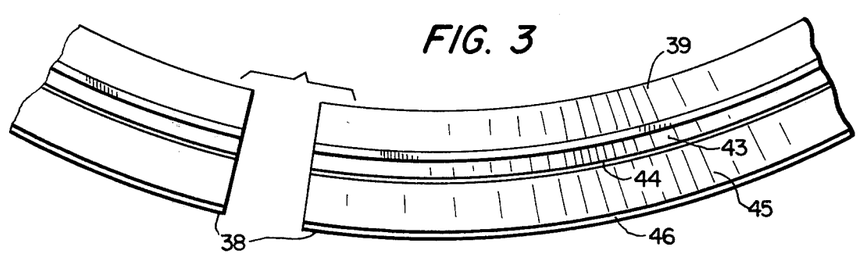
FIG. 3 is a fragmentary top plan view of a split ring constituting the locking means of the connector of FIGS. 1 and 2.

Connector body 21 encloses and supports an annular locking means, indicated generally at 35, a first actuating means comprising a resilient metal split ring 36 and a second actuating means comprising a rigid driving ring 37. In this embodiment, the locking means is a single resilient metal split ring 38, the inner surface of which is made up of a downwardly and inwardly tapering frustoconical locking shoulder 39, a right cylindrical surface portion 40 and an upwardly and inwardly tapering frustoconical surface 41. Surface portion 40 joins the lower edge of shoulder 39 and the upper edge of surface 41. At its bottom end, ring 38 has a flat transverse annular face 42, the inner periphery of which joins surface 41. Shoulder 39 tapers at the same angle as upper side wall 16 of locking groove 15. The outer surface of ring 38 is made up of a frustoconical surface portion 43 which tapers sharply upwardly and inwardly at, e.g., 30°, a slow taper surface portion 44 which tapers upwardly and inwardly at, e.g., 3.5°, an additional frustoconical surface portion 45 which tapers upwardly and inwardly at the same angle as surface portion 43, and a lower slow taper surface portion 46 which tapers upwardly and inwardly at the same angle as does surface portion 44. Shoulder 39 and surface portion 43 effectively combine to form the upper end of ring 37. Surface portion 46 extends to lower end face 42, the corner being chamferred as shown.

Figure 4:
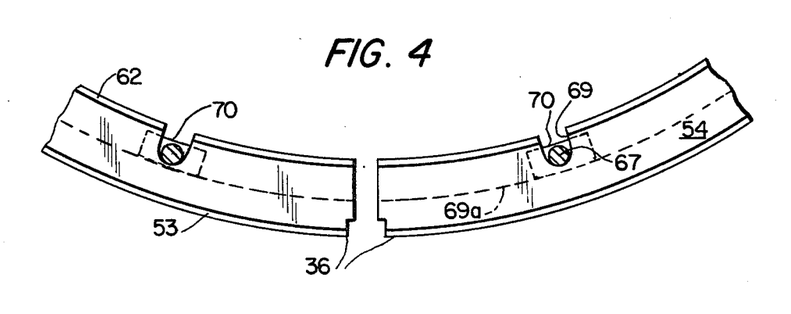
FIG. 4 is a fragmentary top plan view of a split ring forming part of the first actuating means of the connector.

Split ring 36 of the first actuating means has an inner surface made up an elongated upper slow taper surface portion 48 which tapers upwardly and inwardly at the same angle as surface portions 44,46 of ring 38, a frustoconical surface portion 49 which joins the lower edge of portion 48 and tapers upwardly and inwardly at the same angle as do surface portions 43 and 45 of ring 38, a slow taper surface portion 50 which tapers upwardly and inwardly at the same angle as portion 48 and joins the lower edge of portion 49, and an additional frustoconical surface portion 51 which tapers upwardly and inwardly at the same angle as portion 49 and joins the lower edge of portion 50. The outer surface of ring 36 is a continuous upwardly and inwardly tapering frustoconical surface 52 which is parallel to surface portions 48 and 50. At its upper end, ring 36 is provided with a radially short transverse annular outwardly projecting flange 53. The upper end of ring 36 presents a flat transverse annular surface 54.

Figure 5:
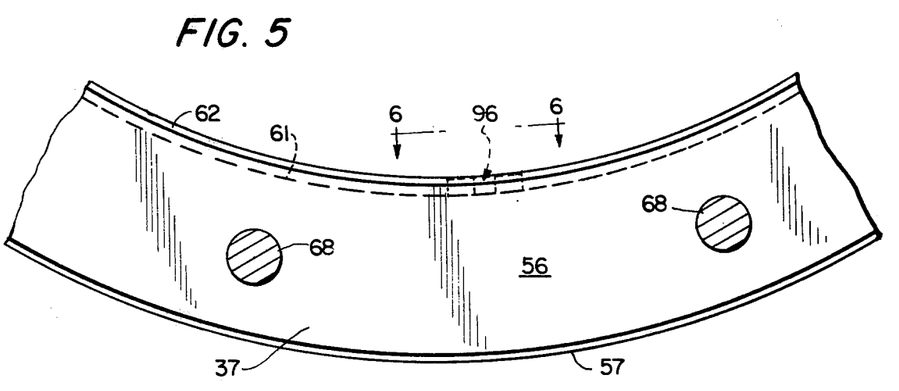
FIG. 5 is a fragmentary top plan view of a driving ring forming part of the second actuating means of the connector.
Figure 6:
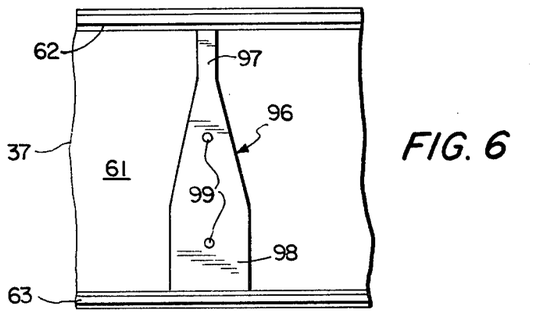
FIG. 6 is a fragmentary side elevational view taken generally as indicated by line 6—6, FIG. 5.

Driving ring 37 of the second actuating means is an integral continuous metal ring having a flat transverse upper end face 56, a right cylindrical outer surface 57, a stepped lower end face made up of outer transverse annular portion 58, intermediate right cylindrical portion 59 and an inner transverse annular portion 60. Inner surface 61 of the driving ring is a frustoconical surface which tapers upwardly and inwardly the same angle as surface 52 of ring 36. The upper end of the driving ring is provided with a radially short transverse annular inwardly projecting flange 62 defining the upper end of inner surface 61 and projecting radially inwardly therefrom. The dimensions of the upper end of the driving ring are such that the upper end of the ring can be freely accommodated by downwardly opening groove 23 in flange 8. An annular end ring 63 is secured to the lower end face of the driving ring, as by screws, ring 63 having a strapped upper surface shaped and dimensioned for flush engagement with bottom surfaces 58–60 of the ring. The lower face of ring 63 is flat and parallel to upper end face 56. An inner peripheral portion of ring 63 projects radially inwardly beyond the lower end of inner surface 61, thus presenting a lower retaining flange opposed to flange 62. The axial length of the driving ring, i.e., the distance from face 56 to the lower face of ring 63, is substantially smaller than the distance from the upper wall of groove 23 to the upper surface of portion 27 of member 20. The axial length of inner surface 61 of ring 36 between flanges 62 and the flange constituted by the inner peripheral portion of end ring 63 is substantially equal to the axial length of outer surface 52 of split ring 36.

For simplicity, surfaces 43, 49, 52 and 61 can be considered as primary active surfaces and will be referred to respectively as first, second, third and four frustoconical surfaces.

Power to operate the connector is provided by a first group of fluid pressure operated power devices 65, FIG. 2, which are of relatively smaller size and form part of the first actuating means, and a second group of relatively larger power devices 66, which form part of the second actuating means. Power devices 65 and 66 are advantageously commercially standard hydraulic rectilinear motors of the piston-and-cylinder type. Smaller motors 65 are arranged in an equally spaced annular series adjacent the outer surface of body 1, the annular series being concentric with the axis of bore 3, the cylinder units of the motors being secured to flange 8 and projecting upwardly therefrom, the piston rods 67 of motors 65 extending downwardly through vertical bores in the flange. Larger motors 66 are similarly arranged in an annular series of larger diameter concentric with the axis of bore 3, the cylinder units of motors 66 being mounted on flange 8 and projecting upwardly therefrom, piston rods 68 of these motors extending downwardly through vertical bores in the flange, as shown. The upper end portion of ring 36 is provided with an annularly spaced series of slots 69 equal in number to piston rods 67. Slots 69 extend radially relative to ring 38, open into a transverse annular inwardly opening groove 69a in the upper end portion of ring 36, the outer wall of the groove being spaced outwardly from the outer ends of the slots. The lower end portions of piston rods 67 project downwardly through the respective slots 69 and terminate in an enlargement constituting a lateral flange 70, each flange 70 being slidably retained in groove 69a by a different one of the slots 69. Thus, ring 36 is supported on flange 8 by piston rods 67 and the cylinder units of motors 65 and can be moved upwardly and downwardly by simultaneous energization of motors 65.

The lower ends of piston rods 68 of motors 66 are rigidly connected to driving ring 37 in any suitable conventional fashion, as by screw threads. Ring 37 is thus supported on flange 8 by motors 66, and motors 66 can be operated to move the driving ring upwardly and downwardly.

When substantially relaxed and undistorted, the diameter of outer surface portion 44 of ring 38 is equal to the diameter of inner surface portion 50 of ring 36 when ring 36 is substantially relaxed and undistorted. When the locking ring 38 is in its expanded, inactive position, inner surface portion 50 of ring 36 slidably embraces outer surface portion 44 of ring 38, both split ring 36 and driving ring 37 then being in their uppermost first positions, as shown in FIG. 1.

A plurality of rigid metal balls 75 are disposed in the space between outer surface 52 of ring 36 and inner surface 61 of the driving ring, all of balls 75 having the same diameter and each of the balls being in direct rolling engagement with both surface 52 and surface 61. The number of balls 75 is substantially less than would be required to fill the space between flange 53 and end ring 63 when rings 36 and 37 are in their first positions.

Upper body 1 is equipped with a metal seal ring 77, FIG. 1, having a right cylindrical inner surface 78 and an outer surface made up of an upper frustoconical surface portion 79 which tapers upwardly and inwardly at the same angle as surface 4 of body 1, and a lower frustoconical surface portion 80 which tapers downwardly and inwardly at the same angle as surface 11 of body 2. Such seal rings are conventional and are releasably retained on body 1 by a plurality of retaining pins, not shown.

With rings 36–38 and balls 75 interrelated as shown in FIG. 1, outer surfaces 43–46 and 52 of ring 38 and 36 constitute cam follower surfaces, and inner surfaces 48–51 of ring 36 and inner surface 61 of the driving ring constitute camming surfaces. Camming surfaces 48–51 of ring 36 coact in direct sliding engagement with the cam follower surfaces of ring 37. Camming surface 61 of ring 36 coacts with cam follower surface 52 of ring 36 only through balls 75, with the balls constituting rolling antifriction elements.

Preparatory to making up the connection between bodies 1 and 2, with body 2 having been installed in an underwater location and with the installation including an appropriate guidance system, body 1, with connector body 21 installed thereon and with the parts of the connector occupying the positions seen in FIG. 1, is lowered with the aid of the guidance system and landed on body 2. So landed, body 1 is disposed with its end face in engagement with the end face of body 2, shoulder 7 of body 1 thus engaging shoulder 14 of body 2. Surfaces 79, 80 of seal ring 77 engage surfaces 4 and 11, respectively, and the seal ring is preliminarily energized as a result of landing body 1. With the end faces of bodies 1 and 2 thus engaged, member 20 of connector body 21 surrounds the upper end portion of body 2 and supports split ring 38 in such alignment with locking groove 15 that locking shoulder 39 of ring 38 is radially aligned with, but spaced outwardly from, upper side wall 16 of the locking groove, so that side wall 16 constitutes a mating shoulder for shoulder 39.

Figure 7:
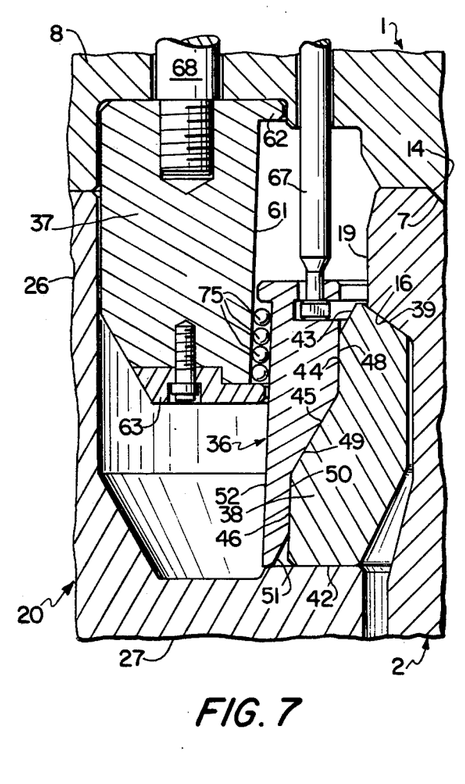
FIGS. 7 and 8 are fragmentary vertical sectional views similar to FIG. 1 but showing successive stages of operation of the connector.

Motors 65 are now operated simultaneously, by simultaneous supply of pressure fluid from a source at the operational base at the surface of the body of water, the pressure fluid being supplied above the pistons of the motors to cause piston rods 67 to drive ring 36 downwardly. As ring 36 descends, ring 38 is restrained against downward movement because it is engaged slidably with the inner peripheral portion of the upper surface of portion 27 of member 20. Accordingly, downward movement of ring 36 cams ring 38 inwardly in two stages to the position seen in FIG. 7. The first stage results from coaction of surfaces 49 and 51 of ring 36 with surfaces 43 and 45, respectively, of ring 38 and brings the slow taper portions 48 and 50 of ring 36 into engagement with the mating surfaces 44 and 46, respectively, of ring 38. The second stage of camming action occurs by coaction of surfaces 48,50 with surfaces 44 and 46, respectively, and cams ring 38 further inwardly into groove 15, with shoulder 39 of the ring then engaging upper side wall 16 of the groove, as seen in FIG. 7. Driving ring 37 remains in its uppermost position throughout the full downward travel of ring 36, but since outer surface 52 of ring 36 and inner surface 61 of the driving ring are parallel upwardly and inwardly tapering frustoconical surfaces and downward movement of ring 36 is essentially vertical, no change occurs in the radial spacing between surfaces 52 and 61. The vertical space between flange 53 and end ring 63 decreases markedly as a result of downward travel of ring 36, but the number of balls 75 is selected so that the quantity of balls employed substantially fills the space between flange 53 and ring 63 only when ring 36 has reached its lowermost second position, seen in FIG. 7.

Figure 8:
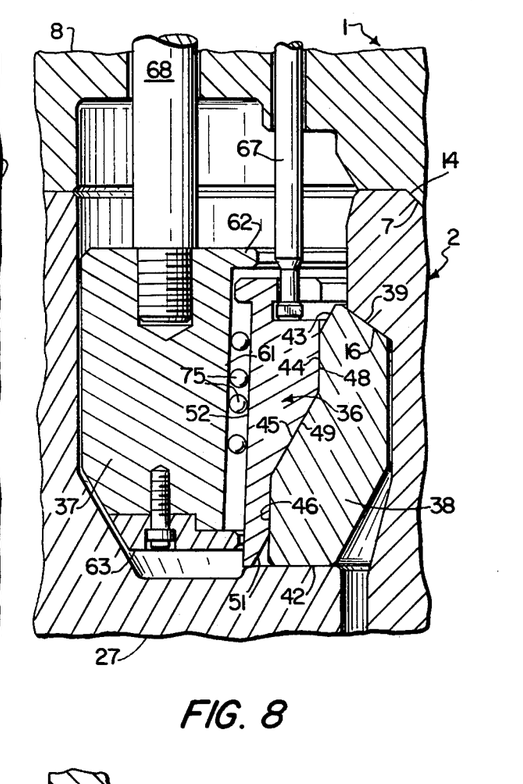
Figure 9:
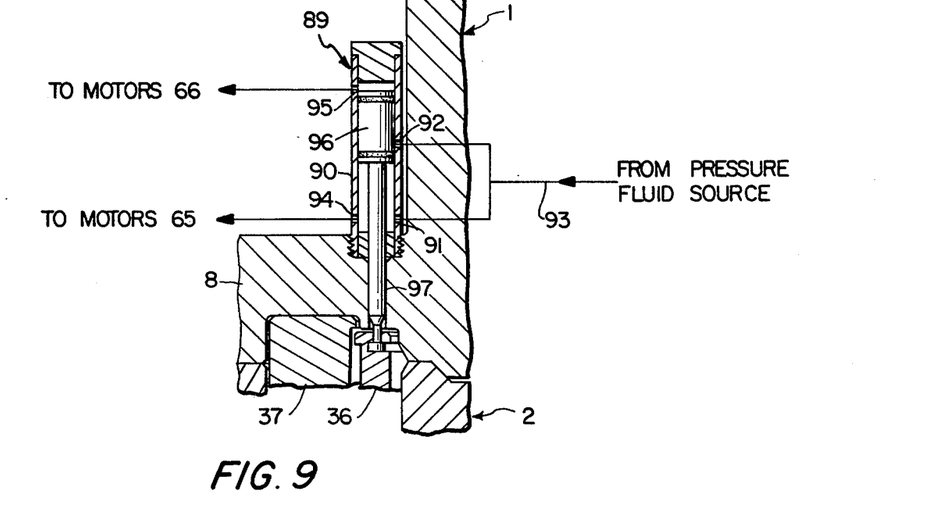
FIG. 9 is a fragmentary vertical sectional view of an automatic control valve employed in the connector of FIGS. 1–8 to accomplish sequential operation of the first and second actuating means of the connector.

Motors 65 of the first actuating means can now be deenergized or, alternatively, left energized, and motors 66 of the second actuating means are now all energized simultaneously to move driving ring 37 downwardly to its lowermost second position, seen in FIG. 8. Since balls 75 are constantly engaged between camming surface 61 of the driving ring and cam follower surface 52 of ring 36, and since those surfaces are parallel and taper upwardly and inwardly, the effect of full downward movement of the driving ring is to radially distort the combination of ring 36 and locking ring 38 inwardly. Though locking shoulder 39 of ring 38 was already in flush engagement with mating shoulder 16 at the start of the downward movement of ring 37 (see FIG. 7), the angle of taper of surfaces 52 and 61 is small, e.g., 3.5°, and the inward movement of the combination of rings 36 and 38 caused by the downward movement of the driving ring is accordingly small. But this small additional inward movement of ring 38, caused by the higher power of larger motors 66 and the higher mechanical advantage afforded by slow taper surfaces 52 and 61, results in a very strong wedging action at shoulders 16 and 39 and is effective to establish the desired very high compressive preload on the now-clamped end faces of bodies 1 and 2. Under optimum conditions, wedging engagement of frustoconical surfaces 7 and 14 progresses as the preload is established until, as shown in FIG. 8, surfaces 6 and 13 are also in tight flush engagement. Since shoulders 16, 39, 14 and 7 are all mutually parallel, the compressive force of the high preload is applied in a direction substantially normal to all of those shoulders, and therefore acts primarily in compression without generating a shear component of practical effect. The further wedging action at shoulders 16 and 39 which results from full downward actuation of the driving ring also causes seal ring 77 to be further energized between seal faces 4 and 11, assuring that ring 77 effects a good metal-to-metal seal with bodies 1 and 2 so that fluid under pressure in bores 3 and 10 cannot act between the clamped end faces of bodies 1 and 2.

Since the connector illustrated in FIGS. 1-4 is to be made up at a remote underwater site which is not accessible for direct manual manipulation, it is desirable to accomplish the successive operation, first of motors 65, then of motors 66, automatically. For this purpose, the connector is equipped with an automatic sequencing valve 89, FIG. 9, responsive to the position of ring 36 for applying pressure fluid from a single surface-located source first to all of motors 65 simultaneously and then, when ring 36 has reached its lowermost position, to all of motors 66 simultaneously to energize motors 66 to force the driving ring to its lowermost second position. Valve 89 can be of any conventional type for supplying incoming fluid initially to only a first outlet, then to a second outlet in response to movement of an actuator. For illustrative purposes, valve 89 is shown as comprising an upright tubular body 90 secured to and projecting upwardly from flange 8, the body having two inlet ports 91 and 92 connected in parallel to pressure fluid supply conduit 93, and two outlet ports 94 and 95, port 94 being connected in parallel by conduiting (not shown) to the upper ends of the cylinders of all of the motors 65, and port 95 being similarly connected in parallel to all of the motors 66. The valve includes a movable valve member 96 secured to and operated by a rod 97 which extends downwardly through a bore in flange 8, the lower end of rod 97 projecting downwardly beyond flange 8 and being connected to the upper end portion of ring 36 in the same manner hereinbefore described for piston rods 66 of motors 65. Hence, the vertical position of rod 97, and therefore the vertical position of movable valve member 96, depend upon the vertical position of ring 36. Movable valve member 96 is cylindrical and slidably engaged with the inner wall of valve body 90p and is so dimensioned, and ports 91 and 92 are so located, that movable valve member 96 allows communication between inlet port 91 and outlet port 94 for all positions of ring 36 but allows communication between inlet port 92 and outlet port 95 only when ring 36 is in its lowermost position.

The connector is released remotely by venting the power cylinders of motors 65 and 66 above the pistons and simultaneously supplying pressure fluid below the pistons of all of motors 65 and 66, thereby raising rings 36 and 37 simultaneously to their uppermost or first positions. Alternatively, motors 66 can be energized first, to raise driving ring 37, and motors 65 then energized to raise ring 36. With rings 36 and 37 in their uppermost positions, locking ring 38 is free to expand resiliently to its normal relaxed inactive position. Expansion of ring 38 to its relaxed position withdraws the ring from locking groove 15 and thus frees body 1 and connector body 21 for upward withdrawal. Should ring 38 not expand freely when rings 36 and 37 are raised, applying an upward strain on body 1 will cause surfaces 16 and 39 to coact in camming fashion, so aiding the inherent resilience of the locking ring and assuring that that ring disengages from groove 15.

With regard to relative axial movement, balls 75 are constrained to the space between flange 53 of ring 36 and end ring 63 of the driving ring. However, since the balls are engaged by cam follower surface 52 and since ring 36 is a split ring and is radially distorted by operation of the driving ring, means must be provided to prevent the balls from entering the space between the ends of ring 36. In this embodiment, this is accomplished by securing to the inner surface 61 of ring 37 a filler block 100, FIGS. 5 and 6, of such thickness, radially of the rings, that the filler block will bridge the radial space between surfaces 52 and 61 and project into the gap between the ends of split ring 36. Since the gap between the ends of the split ring is narrower when both rings occupy their first positions (FIG. 1) and wider when ring 36 occupies its second position (FIGS. 7 and 8), the block has a circumferentially narrower upper portion 101 and a circumferentially wider lower portion 102, the block tapering between those two portions and the effective axial space between the two portions being equal to the effective length of the excursion of ring 36 between its first and second positions. Block 100 is rigidly secured to the driving ring, as by screws 103.

Figure 10:
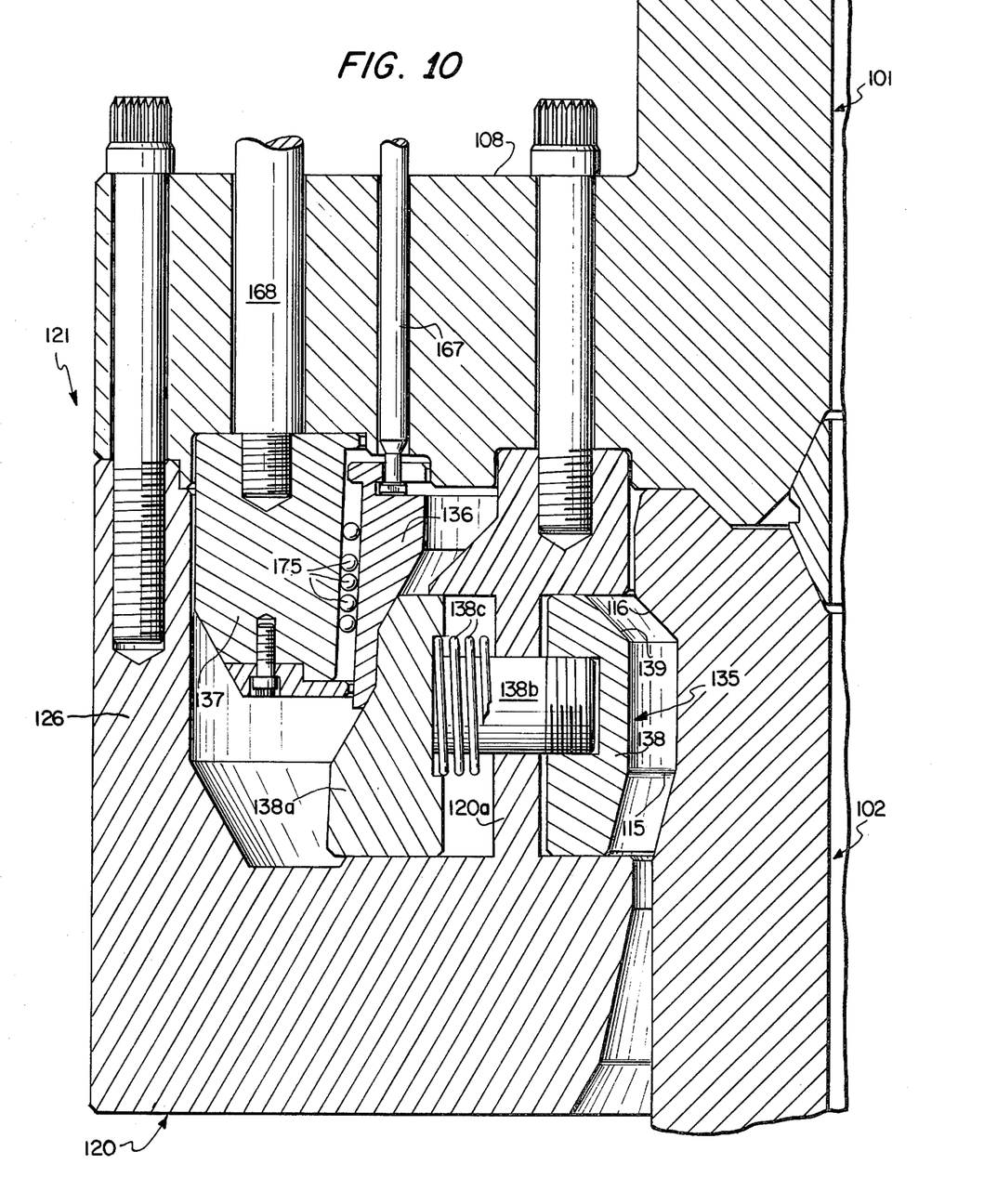
FIG. 10 is a view similar to FIG. 1 of a connector according to another embodiment of the invention.

The Embodiment of FIG. 10

The embodiment of the invention shown in FIG. 10 illustrates the fact that the invention is applicable to connectors which employ radially distortable annular locking means other than those based on a split locking ring. Here, the locking means 135 comprises a plurality of circularly arranged identical arcuate segment units each comprising an arcuate segment body 138 and an arcuate follower body 138a rigidly interconnected by a radially extending shaft 138b. Upper wellhead body 101 is generally as described with reference to FIGS. 1-9 and includes transverse annular outwardly projecting flange 108. Connector body 121 is again defined by the combination of flange 108 and member 120, but member 120 is modified to include a cylindrical portion 120a which surrounds groove 115 of body 102 when body 101 has been landed on body 102. In this embodiment, both outer wall portion 126 and inner portion 120a are bolted to flange 108, as shown. Portion 120a includes a plurality of radial bores each slidably embracing the connecting shaft 138b of a different one of the segment units. The annular assembly of segments is yieldably biased radially outwardly by a plurality of pairs of helical compression springs 138c, the springs of each pair being disposed each on a different side of the corresponding shaft 138b and engaged in compression between the follower body 138a and portion 120a of member 120. Each segment body 138 includes a frustoconical locking shoulder 139 which tapers downwardly and inwardly at the same angle as does mating shoulder 116 of groove 115.

The first actuating means, comprising spit ring 136 and piston rods 167 of the associated rectilinear power devices, is as described with reference to FIGS. 1, 7 and 8. The second actuating means, comprising driving ring 137 and piston rods 168, remains as described with reference to FIGS. 1, 7 and 8. Antifriction balls 175 are again engaged between cam follower surface 152 of ring 136 and camming surface 161 of the driving ring.

While FIG. 10 illustrates the connector with rings 136 and 137 in their raised initial positions, it will be apparent that, when ring 136 is driven downwardly to its second position (corresponding to that seen in FIG. 7 the inner surface portions of ring 136 will coact with the mating outer surface portions of follower bodies 138a to force the segment units radially inwardly until, when ring 136 reaches its lowermost or second position, locking shoulder 139 is in flush engagement with mating shoulder 116. Then, when driving ring 137 is moved downwardly to its second position (corresponding to FIG. 8) the combination of ring 136 and the segment units is forced radially inwardly to cause a strong wedging action between shoulders 139 and 116 to establish the desired large clamping force and compressive preload.

It will be apparent from the foregoing, and from the disclosure in aforementioned copending application Ser. No. 327,445, that the invention is applicable to connectors employing other types of locking means, such, for example, as an annular series of pivoted locking dogs as disclosed in U.S. Pat. No. 3,096,999, or the conventional collet type of locking means.

While the invention has been illustrated and described with reference to connectors in which the locking means is radially distorted between an outer, inactive position and an inner, active position, it will be apparent to those skilled in the art that the invention is also applicable to connectors in which the annular locking means is resiliently distortable from an inner, inactive position to an outer, active position. While the antifriction elements have been shown and described as spherical balls, it will be understood that other rolling antifriction elements can be used, such as rollers in the manner described in aforementioned application Ser. No. 327,445.

What is claimed is:

1. In a connector for connecting two members together under a large clamping force, the combination of:
    a connector body to be joined to one of the members to be connected and dimensioned to be moved in telescopic relation relative to the other member to be connected;
    annular locking means carried by the connector body and presenting a generally annular locking shoulder capable of flush engagement with a mating shoulder carried by the other member to be connected,
        the locking means being radially distortable between an inactive position, in which the locking shoulder is spaced radially from the mating shoulder, and an active position, in which the locking shoulder engages the mating shoulder when the connector body is operatively positioned relative to the other of the members to be connected, the locking means being yieldably biased toward its inactive position,
        the locking means having a first annular surface which is directed toward the other of the members to be connected and a second annular surface directed away from the other member to be connected, the second annular surface of the locking means having a first frustoconical surface;
    first actuating means carried by the connector body and comprising a resiliently expansible and contractible annular member dimensioned for telescopic engagement with the second annular surface of the locking means and having
        a second frustoconical surface constituting a camming surface which tapers in the same direction and at the same angle as the first frustoconical surface and is disposed to engage the first frustoconical surface in camming relation as the annular member is moved telescopically relative to the locking means,
        the annular member also having a third frustoconical surface constituting a cam follower surface which faces radially away from the second frustoconical surface and tapers in the same direction as the second frustoconical surface but at a smaller angle;
    second actuating means comprising a rigid driving ring having a fourth frustoconical surface facing toward the third frustoconical surface and tapering in the same direction and at the same angle as the third frustoconical surface; and
    a plurality of rigid rolling antifriction elements disposed between and in direct rolling engagement with the third and fourth frustoconical surfaces;
    the annular member of the first actuating means being disposed for movement axially of the connector and independently of the driving ring of the second actuating means between a first position, in which the locking means is allowed to assume its inactive position, and a second position,
        movement of the annular member to its second position causing the first and second frustoconical surfaces to coact to displace the locking means through most of the excursion of the locking means from its inactive position to its active position;
    the driving ring of the second actuating means being disposed for movement axially of the connector between a first inactive position and a second fully actuated position, movement of the driving ring from its first position to its second position causing the third and fourth frustoconical surfaces and the rolling antifriction elements to coact to radially distort the annular member of the first actuating means and drive the locking means through the remaining portion of its excursion to bring the locking shoulder into final engagement with the mating shoulder.

2. The combination defined in claim 1, wherein:
    the locking means is a resilient metal split ring;
    the locking shoulder and the mating shoulder are frustoconical shoulders which taper at the same angle and in the same direction;
    movement of the annular member of the first actuating means to its second position displaces the locking means to such an extent that the locking shoulder is in flush engagement with the mating shoulder; and
    movement of the driving ring of the second actuating means to its second position causes further displacement of the locking means to effect a strong wedging action between the locking and mating shoulders.

3. The combination defined in claim 2, wherein:
    the annular member of the first actuating means is a resilient metal split ring.

4. The combination defined in claim 1, wherein:
    the first actuating means further comprises
        a first set of rectilinear power devices connected to the annular member to drive the same between its first and second positions; and the second actuating means further comprises
a second set of rectilinear power devices connected to the driving ring to drive the same between its first and second positions.

5. The combination defined in claim 4, wherein:
the power devices of the second set are more powerful than those of the first set.

6. The combination defined in claim 4, wherein:
the annular member of the first actuating means is a resilient metal split ring;
each of the power devices of the first set includes a driving rod and a connection between the driving rod and the split ring; and
the connections between the driving rods and the split ring afford freedom of movement of the split ring laterally relative to the driving rods.

7. The combination defined in claim 6, wherein:
the split ring includes an annular flange projecting transversely of the ring,
the flange of the split ring having a circumferentially spaced series of slots which extend radially relative to the split ring; and
the driving rod of each of the power devices of the first set includes
a stem portion of transverse dimension to be freely accommodated by one of the slots in the flange of the split ring, and
a head portion slidably engaged beneath the flange of the split ring.

8. The combination defined in claim 7, wherein:
the slots in the flange of the split ring open through the free peripheral edge of the flange.

9. The combination defined in claim 8, wherein:
the split ring has an upper end and a lower end and a transverse annular groove adjacent the upper end, the upper side wall of the groove constituting the lower surface of the flange.

10. The combination defined in claim 1, wherein:
the connector body constitutes a female connector member; and
the male member of the connector is an end portion of the other of the members to be connected, the mating shoulder to be engaged by the locking shoulder of the locking means constituting one side wall of a transverse annular outwardly opening groove in the male member.

11. The combination defined in claim 1, wherein:
the locking means has a first end and a second end and the first frustoconical surface is adjacent the first end, the second annular surface of the locking means further comprising
a first slow taper surface portion extending from the first frustoconical surface toward the second end,
an additional frustoconical surface portion extending from the first slow taper portion toward the second end and tapering in the same direction and at the same angle as the first frustoconical surface portion, and
a second slow taper surface portion extending from the additional frustoconical surface portion toward the second end; and
the annular member of the first actuating means has first and second ends corresponding to the first and second ends of the locking means, the second frustoconical surface portion being intermediate the ends of the annular member of the first actuating means, the annular member further comprising
a first slow taper surface portion extending from the second frustoconical surface portion toward the first end of the annular member and dimensioned for telescopic engagement with the first slow taper surface portion of the locking means,
a second slow taper surface portion extending from the second frustoconical surface portion toward the second end of the annular member and dimensioned for telescopic engagement with the second slow taper surface portion of the locking means, and
an additional frustoconical surface portion extending from the second slow taper surface portion of the annular member toward the second end and tapering in the same direction and at the same angle as the second frustoconical surface.

12. The combination defined in claim 11, wherein:
when in its first position, the annular member of the first actuating means is disposed with its additional frustoconical surface portion engaging the additional frustoconical surface portion of the locking means,
the second slow taper surface portion of the annular member then engaging the first slow taper surface portion of the locking means, and
the second frustoconical surface then engaging the first frustoconical surface.

13. The combination defined in claim 12, wherein:
the second frustoconical surface is axially longer than the first frustoconical surface; and
the axial length of the additional frustoconical surface portion of the locking means is equal to the axial length of the second frustoconical surface.

14. The combination defined in claim 4 and further comprising:
an automatic control device for selectively energizing the first set of power devices and the second set of power devices.

15. The combination defined in claim 14, wherein:
the automatic control device is carried by the connector body and is responsive to the position of the annular member of the first actuating means.

16. The combination defined in claim 15, wherein:
the power devices are fluid pressure operated motors; and
the control device is a valve having a movable valve member connected to the annular member of the first actuating means.

17. The combination defined in claim 1, wherein:
the annular member of the first actuating means is a resilient metal split ring; and
the driving ring of the second actuating means is equipped with a filler member projecting from the fourth frustoconical surface into the gap between the ends of the split ring of the first actuating means, the filler member being operative to exclude the rolling antifriction elements from the gap between the ends of the split ring.

18. In a remotely operated connector for connecting together two members of an underwater well assembly under a large clamping force, the connector being of the type in which an annular locking means having a frustoconical locking shoulder is carried by one of the two members and is arranged for actuation from a first, inactive position to a second, active position in which the frustoconical locking shoulder is engaged with a mating shoulder carried by the other of the two members, the combination of:

first actuating means constructed and arranged to actuate the annular locking means to such an extent that the locking shoulder of the annular locking means is preliminarily engaged with the mating shoulder, the first actuating means comprising camming means in direct sliding engagement with the locking means; and second actuating means acting on the first actuating means and forcing the preliminarily engaged locking shoulder into strong wedging engagement with the mating shoulder, the second actuating means comprising camming means acting on the first actuating means only through annularly arranged low friction means.

* * * * *